United States Patent [19]

Kollmeier et al.

[11] 4,098,729

[45] Jul. 4, 1978

[54] PROCESS OF PRODUCING CROSS-LINKED URETHANE-GROUP COMPRISING FOAMS OF OPEN-CELL STRUCTURE

[75] Inventors: Hans-Joachim Kollmeier, Essen-Werden; Gerd Rossmy, Haltern-Lavesum, both Germany

[73] Assignee: Th. Goldschmidt AG, Essen, Fed. Germany

[21] Appl. No.: 704,810

[22] Filed: Jul. 13, 1976

Related U.S. Application Data

[63] Continuation-in-part of Ser. No. 564,052, Apr. 1, 1975, and a continuation-in-part of Ser. No. 656,829, Feb. 10, 1976, abandoned.

[30] Foreign Application Priority Data

Apr. 8, 1974 [CH] Switzerland ............... 4894/74
Feb. 14, 1975 [GB] United Kingdom ......... 6460/75

[51] Int. Cl.$^2$ ................................................ C08J 9/00
[52] U.S. Cl. ................................. 521/128; 521/129; 521/166; 521/176
[58] Field of Search .............. 260/2.5 AM, 2.5 AP, 260/2.5 AS, 2.5 AC

[56] References Cited

U.S. PATENT DOCUMENTS

| | | | |
|---|---|---|---|
| 3,586,650 | 6/1971 | Gibbons et al. | 260/2.5 AS |
| 3,717,597 | 2/1973 | Hesskamp et al. | 260/2.5 AK |
| 3,723,365 | 3/1973 | Speranza et al. | 260/2.5 AS |
| 3,931,066 | 1/1976 | Puig et al. | 260/2.5 AS |
| 3,956,202 | 5/1976 | Iwasaki | 260/2.5 AM |

OTHER PUBLICATIONS

Handbook of Chem. & Physics (47th ed.) (Chem. Rubber Co.) (Cleveland, O.) (1966) pp. C-74, C-399, C-449, & C-551.
Luck–Water, a Comprehensive Treatise (vol. 2), pp. 277-284 (Plenum) (N.Y.) (1973).
Luck–Tenside Detergents, 11, 145-155 (1974).
Wicke–Angewandte Chemie, 78, 1-19 (1966).
Deguchi et al.–J. Colloid Interface Sci., 50, 223-227 (1975).
Schwuger–Kolloid–Zeitschrift, 232, 775-781 (1968).
Corkill et al.–Trans. Faraday Soc. 63, 240-247 (1967).

*Primary Examiner*—Lewis T. Jacobs
*Attorney, Agent, or Firm*—Toren, McGeady and Stanger

[57] ABSTRACT

In the disclosed process of producing resilient open-celled, cross-linked polyurethane foams, by foaming polyol, a polyisocyanate, catalyst and blowing agent, the foaming is effected in the presence of a cross-linker which is a saturated or unsaturated, aliphatic, cycloaliphatic, heteroaliphatic or arylaliphatic crystalline polyhydroxy compound having at least three hydroxy groups. The crystalline polyhydroxy compound is insoluble or only slightly soluble in the polyl to be foamed and melts within the temperature range of about 60 - 160° C. The amount of crystalline polyhydroxy compound to be used corresponds to about 0.1 - 5.0 hydroxy equivalent weights per 1 hydroxy equivalent weight of the polyol to be foamed. Additionally, a compound that breaks down the association of water molecules can be added.

13 Claims, No Drawings

PROCESS OF PRODUCING CROSS-LINKED URETHANE-GROUP COMPRISING FOAMS OF OPEN-CELL STRUCTURE

CROSS REFERENCE TO RELATED APPLICATIONS

This is a Continuation-in-Part of copending application Ser. No. 564,052, filed on Apr. 1, 1975, and of application Ser. No. 656,829, filed on Feb. 10, 1976, now abandoned.

FIELD OF THE INVENTION

The invention is directed to a process of producing cross-linked, resilient (elastic) urethane-group comprising foams of open-celled structure. The term "urethane-group comprising foams" — hereinafter sometimes referred to as "polyurethane foams" — is deemed to include polyurethane foams proper as well as foams which contain other groups in addition to urethane. The inventive procedure is concerned with the production of polyurethane foams of the indicated nature which is effected by foaming a system comprising
  (a) polyols having active hydrogen atoms with hydroxy equivalent weights of between 700 – 5000 — for example, polyetherpolyols of the indicated hydroxy equivalent weight range -;
  (b) polyisocyanate;
  (c) a blowing agent, such as, water and/or organic propellant; and
  (d) catalysts.

The foaming system may additionally and optionally contain stabilizers, emulsifiers and/or cross-linkers which contain at least three active hydrogen atoms and are liquid or are solid, but are soluble in the polyol to be foamed.

The term "hydroxy equivalent weight" as used herein is defined by the molecular weight of the compound divided by the number of OH groups.

BACKGROUND OF THE INVENTION

Polyurethane foams are generally obtained by reacting polyisocyanates with polyols, the latter containing active hydrogen atoms. Such foams are widely used in industry and are, for example, employed for insulation purposes, for the production of structural elements and for upholstery and elastomeric purposes.

For many of the applications to which such foams are put, it is desirable that the foams have an open cell structure. Foams with closed cells exhibit decreased elasticity or resiliency and, moreover, have a tendency to shrink after the production. It is, moreover, desired that the load bearing capability or the hardness of open cell, resilient foams should be variable over a wide range. The desired hardness can be imparted to a foamed body by increasing the degree of cross-linking, by increasing its unit weight or density or by increasing the isocyanate content of the formulation. From a technical and economical point of view, an increase of the degree of cross-linking is the most advantageous of these three possibilities. This is so because in order to increase the unit weight (density) or the isocyanate content, larger amounts of starting materials are required which, of course, renders the production of the foams less economical. Further, an increase in the isocyanate content is disadvantageous because foams with increased isocyanate content have greater tendency to flammability and toxicity. Moreover, the "feel" of the foams becomes harder with increased isocyanate content.

According to the present state of the art, an increase in the degree of cross-linking of a polyurethane foam formulation is obtained by adding low molecular, polyfunctional compounds which are soluble in the active hydrogen atom-comprising polyols. This means that the cross-linking agents can react immediately upon initiation of the foam forming reaction. The possibility of increasing the cross-linking density is, however, limited in such a procedure. This is due to the fact that, dependent on the other ingredients of the foaming formulation, the cross-linking density at the time at which the foams have reached their maximum rising height — to wit, the time at which usually the cell opening is initiated — is already too high to permit effective cell opening.

Foams are then obtained which, it is true, have a high cross-linking degree. These foams, however, have a large proportion of closed cells. In some instances, all the cells are then closed. Such foams exhibit decreased flexibility and resiliency and, due to the fact that the cells are closed, have the tendency to shrink after the production.

SUMMARY OF THE INVENTION

It is a primary object of the present invention to provide a procedure for the production of polyurethane foams which have a high degree of cross-linking and thus, correspondingly, high hardness values while, however, exhibiting a very small proportion of closed cells and thus having exceedingly high resiliency and flexibility values. The foams produced according to the invention do not exhibit shrinking phenomena after the production.

Briefly, and in accordance with the invention, such improved polyurethane foams are surprisingly obtained by using as a cross-linking agent, saturated or unsaturated, aliphatic cycloaliphatic, heteroaliphatic or arylaliphatic, crystalline, polyhydroxy compounds which are only slightly soluble or not soluble at all at room temperature in the polyol to be foamed, the polyhydroxy compounds containing three or more hydroxy groups, preferably primary and/or secondary hydroxy groups, melting in a temperature range of about 60° – 160° C. In accordance with the invention, the polyhydroxy compounds are used in quantities of about 0.1 to 5.0 hydroxy equivalent weights, preferably 0.2 to 3.0 hydroxy equivalent weights, calculated on one hydroxy equivalent weight of the polyol to be foamed.

Foams produced in accordance with the invention exhibit, as compared to prior art polyurethane foams, a number of important advantages. Thus, in accordance with the inventive procedure, it is readily feasible to increase the hardness of polyurethane foams without having to forgo or to decrease other valuable foam characteristics, such as, for example, the elasticity and resiliency as well as the open cell nature of the foam. Further, relatively hard foams with relatively low unit weights can be manufactured, or the hardness of any given foaming system can be significantly increased without changing the unit weight or density. This possibility pursuant to the invention is of particular economical interest, since considerable amounts of relatively expensive raw materials used in the polyurethane formulations can thus be saved.

Some of the other mechanical characteristics of polyurethane foams which, from a practical point of view, are important in the use of such foams, are also changed by using the inventive procedure with the indicated cross-linker.

With increasing amounts of the inventive cross-linkers, the elongation and tear propagation characteristics of the foams are slightly decreased, while the tensile strength by contrast is increased. Other characteristics, such as, for example, compression set, hardness drop after 500,000 load changes (pressure drop), flex fatigue characteristics as well as aging properties and bounce resilience are, however, not noticeably influenced by the inventive procedure.

In a preferred aspect of the present invention, we have further discovered that additional improvements in the product can be obtained by adding from about 0.5 to 50% by weight, based on the amount of water in the foaming formulation, of compounds that break down the association of water molecules to the foaming formulation.

As a result of this added improvement, the reaction of the isocyanate groups with the water in the forming formulation is selectively accelerated. As a result, propellant is available at an earlier stage in the urethane forming reaction, the water reacts as quantitatively as possible with the isocyanate and the tendency of the crystalline polyols to bind the water and thus delay or slow down the foaming reaction is minimized.

DESCRIPTION OF THE PREFERRED EMBODIMENT

The melting points of the crystalline polyhydroxy compounds used as inventive cross-linkers are in the range of between 60° and 160° C, preferably between about 80° to 130° C. The term "melting points" is to be interpreted in this context so as to refer not to the melting points of the pure compounds but rather to the melting points which the polyhydroxy compounds have in the condition in which they are introduced into the system to be foamed.

The amounts of crystalline polyhydroxy compounds which act in cross-linking manner and which, pursuant to the invention, are to be added to a reaction system to be foamed, may vary over a wide range and are, from a practical point of view, determined by the specific composition of the formulation and the specific characteristics which are desired for the foam to be produced. The cross-linking density in polyurethane foams is dependent on the molecular weight and on the functionality of the polyol and isocyanate components as well as on the amount of lower molecular, soluble cross-linking agent which is added. For open cell, soft foams, primarily polyols and isocyanates with functionalities of between 2 and 3, are used. The soluble cross-linkers are oftentimes trifunctional alcohols or amino alcohols which normally are used in concentrations of up to 1.5 hydroxy equivalent weights to one hydroxy equivalent weight of polyol. The polyhydroxy-functional, crystalline cross-linkers may be employed in similar quantities. However, since they, with increasing amounts, do not or only slightly increase the content of closed cells in the foams, they may be used in substantially higher quantities. Thus, for example, 0.1 to 5.0 hydroxy equivalent weights of an inventive cross-linker per hydroxy equivalent weight of the polyol or polyol mixture to be foamed may be successfully employed. From a practical point of view, however, it is preferred to use about 0.2 to 3.0 hydroxy equivalent weights of the crystalline cross-linker for one hydroxy equivalent weight of polyol.

The hydroxy groups of the crystalline polyhydroxy compounds to be used in accordance with the invention may generally be linked to a primary, secondary or tertiary carbon atom. Preferably, they are linked to a primary or secondary aliphatic, saturated carbon atom. However, they may also be linked to an aliphatic, unsaturated carbon atom or to an aromatic carbon atom. Hydroxy groups which are linked to an aromatic carbon atom, are, however, less advantageous for the purposes of the invention.

Examples for crystalline polyhydroxy compounds to be used in accordance with the invention are sorbite, mannite, erythrite, glucose, succrose, hexamethylolmelamine, trimethylolmelamine, trimethylolethane as well as mixtures of these substances or hydrates thereof. Derivatives of these compounds, such as, for example, partial esters or ethers of polyhydroxy compounds are also suitable. Examples are the mono or diesters of sucrose with monocarboxylic acids of 1 to 20 carbon atoms.

It is also feasible within the scope of the present invention to use polyhydroxy-functional polymers whose melting or glass transition temperatures are in the range of between 60° to 150° C. Examples for such substances are polyvinyl alcohol, polyhydroxy-functional esters, such as, polycondensates of dicarboxylic acids with tri- or higher functional alcohols, or copolymers of hydroxyethyl- and hydroxypropylacrylates with nonfunctional acrylic- or methacrylic acid esters.

Aromatic polyhydroxy compounds are less suitable for the inventive procedure since urethanes produced by the reaction of isocyanates with aromatic hydroxy compounds have a tendency to decompose or split into their starting components upon heating.

The polyhydroxyfunctional crystalline cross-linking agents of the invention may be introduced into the polyurethane foam formulations according to different methods. The preparation of polyurethane group containing foams is customarily accomplished by reaction of polyisocyanate with polyols having active hydrogen atoms in the presence of water, in order to liberate the carbon dioxide, which acts as propellant, and, if necessary, in the presence of an additional propellant as, for example, a low boiling halogen hydrocarbon. The system is also admixed with different activators, such as, amines and/or metal salts. The reaction and mixing conditions necessary for obtaining a satisfactory foaming result are those generally prevailing in this well developed art.

The crystalline, polyhydroxyfunctional cross-linkers of the invention may be introduced into the foaming system in such a manner that the cross-linkers, prior to their actual use in the system, are dispersed in a polyol comprising active hydrogen atoms. The crystalline cross-linker may, however, be directly added to the batch or system to be foamed in a fine distribution. According to a preferred embodiment of the invention, the crystalline cross-linker is introduced in the form of a dispersion in a polyol having active hydrogen atoms.

In respect of the polyols, diols, triols or higher functional polyols as well as, if desired, polyethermonools may be used. In some instances it may be advantageous to directly use the polyol which is applied in the foaming system as the dispersion medium. Depending on the molecular structure and the viscosity of the polyol to be foamed, dispersions may then be formed whose viscosity might be too high for practical use. In such instances, it is feasible to use polyols or polyethermonools with a lower viscosity as dispersion media. In doing so, however, it must be considered that the introduction of polyethermonools into the formed polyurethane foams causes a softening effect.

As dispersion agents, other substances can be used, such as, for example, alkyleneglycols, particularly hexyleneglycol. In choosing the particular dispersion agents, it should be considered that these agents should not exert any undesired influence on the reactions which occur during the foaming procedure and, further, that they do not have a softening effect on the ultimately formed foam body.

Polyetherpolyols are preferred as dispersion agents for dispersions of the cross-linkers to be used in accordance with the invention in polyetherurethane foam formulations. Dispersions which are introduced into polyesterurethane foam formulations, by contrast, should contain polyesterpolyols as dispersion agents since, for example, hydrophobic polyethers may have a defoaming effect in such formulations.

The melting points which the crystalline, polyhydroxy compounds exhibit in dispersions with different dispersion agents, may deviate from the melting points of the pure substances. These deviations may be due to different reasons. They may thus be dependent on the manner of preparation of the dispersion, on the grade of dispersion, on solubilization effects caused by the dispersion agent or on the water content of the dispersion agent. Further, the melting point of a dispersion may, in dependance on the manner of preparation, change subsequently. For example, the re-formation of crystal particles in dispersions which are obtained from solutions or melts may, under certain circumstances, be subject to a maturing process of considerable duration. Due to these phenomena, the indicated melting ranges for the dispersed polyhydroxy compounds may also include compounds which, in pure, non-dispersed form, melt outside the defined ranges.

The preparation of dispersions of the crystalline polyhydroxy compounds in, for example, polymeric polyols may be accomplished in different ways. The crystalline polyhydroxy compounds may thus, for example, be mixed with the polyol and the mixture may then be heated above the melting point of the crystalline polyhydroxy compound. The two liquid phases are then emulsified under agitation to form an emulsion in which the polyol constitutes the continuous phase while the cross-linking agent is the dispersed phase. If necessary, an emulsifier may additionally be added to the system.

Upon cooling the emulsion, recrystallization of the polyhydroxy compound takes place under formation of a fine dispersion. The crystalline polyhydroxy compound, together with the polyol, may also be introduced into a ball mill or the like and be ground with or without addition of an emulsifier to form a fine dispersion.

According to a different method for forming the dispersion, a solution of the crystalline polyhydroxy compound may be added to the polyol which latter is used as dispersion agent. If a solvent is chosen in which the polyol is not soluble or soluble to a limited extent only, precipitation of the polyhydroxy compound with the formation of a fine dispersion takes place when the solution is added under agitation to the polyol. The solvent may remain in the dispersion or, in the alternative, the solvent may subsequently be removed under vacuum conditions. If the solvent for the polyhydroxy compound also is a solvent for the polyol, then the solution and the polyol may be mixed and the solvent is then subsequently removed by evaporation under stirring. Also in this instance a dispersion of the crystalline cross-linker in the polyol acting as dispersion agent is formed.

Also in the latter procedure, the preparation of the dispersion may be effected with or without the addition of an emulsifier in a manner well known in the art.

The dispersion of the crystalline polyhydroxy compound is preferably added to the polyol ingredient of the foaming formulation, prior to the mixing of the total reaction mixture used for the foaming. The addition of the dispersion to the polyol may be effected prior or subsequent to its mixture with any propellant, activators and stabilizers used in the foaming formulation.

With a view to determining which crystalline polyhydroxy compound should suitably be employed in a predetermined specific polyurethane foaming system, various guidelines may be used. One of these guidelines are the melting points of the polyhydroxy compounds while another guideline is the composition and foaming characteristic of the reaction ingredients or partners to be foamed. Polyhydroxy compounds which melt in the upper region of the defined melting point range are particularly suitable for use in hot cure foams. In high resilience (HR) or cold cure foam systems, by contrast, the use of polyhydroxy compounds is preferred which melt or soften in the lower region of the defined melting point range. However, if a hot foam formulation is foamed, with the addition of larger amounts of propellants, such as, for example, trichlorofluoromethane, it is sometimes advantageous to use lower melting cross-linkers. The precondition for the effect and activity of the inventive cross-linking procedure is that the foaming system, in the course of the foaming, reaches a temperature which is above the melting temperature of the specific crystalline polyhydroxy compound employed. A preferred precondition for the inventive procedure is present, if the above defined melting temperature of the polyhydroxy compound — cross-linker approximately coincides with that temperature which prevails in the foam reaction mixture at the time at which it has reached its ultimate foaming height. In systems in which this precondition can not be fulfilled or adjusted, the desired cross-linking can be induced by extraneous heat supply. In instances in which the temperature of the foamed reaction mixture does not reach the melting temperature of the added cross-linking agent, a weaker cross-linking effect is inherently obtained. Since with the use of fine dispersions, however, a pronounced cross-linking effect is nevertheless obtained, it may, for reasons of, for example, raw material costs, be worthwhile to employ cross-linkers with higher melting points.

The terms "hot cure foams" or "hot foams" and "high resilience"or "cold cure foams" (cold foams) as used herein are deemed to indicate different kinds of polyurethane soft foam systems whose characteristic features are well known to the skilled art worker. Hot foams are, for example, produced from formulations in which polyether polyols with hydroxy equivalent weights of 700 to 1,500 are present and which contain predominantly secondary hydroxy terminal groups and in which, moreover, metal compounds such as, for example, tin compounds are used as activators in quantities of more than 0.1% per weight. Hot foams, furthermore, must after their preparation, usually be aftertreated at temperatures above 100° C. Detailed descriptions of such systems can be found in, for example, German Offenlegungsschrift 1,745,522 and German Offenlegungsschrift 2,153,086 to which reference is had.

By contrast, high resilience or cold foams are produced from polyetherpolyols with hydroxy equivalent weights between 1,500 and 2,500 in which more than 10 percent of the hydroxy terminal groups are primary hydroxy groups. Cold foams customarily need not be aftertreated at higher temperatures. Cold foam systems are disclosed in detail, for example, in German Offenlegungsschrift 2,221,811 and German Offenlegungsschrift 2,356,433.

Starting materials for the production of the cross-linked, urethane group comprising foams in accordance with the invention are aliphatic, cycloaliphatic and aromatic polyisocyanates, well known in the art for this purpose. Such polyisocyanates are listed, for example, in J. H. Saunders and K. C. Frisch "Polyurethanes Chemistry and Technology", Part I, Interscience Publishers, New York 1962, and in German Offenlegungsschrift 2,221,811. Examples of such polyisocyanates are 2,4- and 2,6-toluylenediisocyanate, trimerized toluylenediisocyanate, diphenylmethane-4,4'-diisocyanate or polymeric isocyanates, such as polyphenyl-polymethylene-polyisocyanate as well as mixtures of these compounds.

Starting materials for the preparation of the inventive foaming systems are, moreover, polyols having at least two active hydrogen atoms, with molecular weights of between 1,000 and 20,000. The polyols may be in the form of polyether polyols or polyester polyols. Suitable polyether polyols are, for example, prepared by reaction of compounds with reactive hydrogen atoms, as for example, di-or polyfunctional alcohols with alkylene oxides, such as ethyleneoxide, propyleneoxide, butyleneoxide, octene-1-oxide, styreneoxide or epichlorohydrin. Di-or polyfunctional alcohols suitable as starters are, for example, ethyleneglycol, butanediol-1,4, glycerin, tris-hydroxypropoxypropane, trimethylolpropane, and sorbite. The polyetherpolyols may exclusively be built up from propyleneoxide or of propyleneoxide and ethyleneoxide. Polyesterpolyols may be obtained, for example, by polycondensation of dicarboxylic acids and di- and trifunctional alcohols, such as,glycol, butanediol-1,4 or trimethylolpropane.

Particularly suitable for the inventive purposes are di- or trihydroxyfunctional polyetherpolyols with hydroxy equivalent weights of between 700 and 5,000. Most preferred are hydroxy equivalent weights of between 1,500 and 4,000.

Polyetherpolyols which exhibit hydroxy equivalent weights of above 1,500 and are composed to 80 of 100 percent of propyleneoxide, can no longer be prepared in purely defined manner by alkaline catalysis. With increasing hydroxy equivalent weights or chain lengths, side reactions occur to an increasing extent which lead to the formation of unsaturated terminal groups, such as allyl or propenylether groups. Due to these side reactions, a decrease of the functionality of the polyetherpolyols results which ultimately leads to the fact that the polyetherpolyol products can no longer be used for the preparation of foam products with valuable technological characteristics.

Amorphous polyetherpolyols with hydroxy equivalent weights of between 1,500 and 5,000 and high propyleneoxide contents in which the functionality caused by the starter molecul is approximately retained, may, however, be produced with different metallo-organic or metal mixed catalysts. Suitable catalyst systems are, for example, doublemetal cyanide complexes whose composition and preparation are disclosed in German Patent No. 1,667,068.

Polyetherpolyols which can be prepared in the presence of these catalysts and with the use of low molecular polyhydroxy compounds, such as, for example, butanediol-1,4 or tris-hydroxypropoxypropane, as starter molecules, contain even at hydroxy equivalent weights in the range of between 1,500 and 5,000 only insignificant amounts of unsaturated terminal polyether-polyol molecules which are formed by rearrangement reactions. The content of unsaturated components in such polyetherpolyols is normally below 0.04 m val of unsaturated components per gram. These polyetherpolyols, whose functionalities and molecular weights are defined in much more pronounced manner by the kind and quantity of the starting ingredients are particularly preferred for the inventive procedure.

Except for their starter building blocks, the preferred polyether polyols may be completely composed of propyleneoxide. In the alternative, they may consist of 5 – 20% by weight of ethyleneoxide and 80 – 95% by weight of propyleneoxide. 10 percent or more of the terminal hydroxyl groups may be in the form of primary hydroxyl groups in the ethyleneoxide containing polyetherpolyols. For higher molecular polyetherpolyols which contain 5 –20% by weight of ethyleneoxide, it is preferred that 20 – 50% by weight of their active hydrogen atoms are present in the form of primary OH-groups.

By using the higher molecular polyetherdiols and -triols, the foams produced in accordance with the invention are imparted with highly elastomeric characteristics. The cross-linking of the relatively long elastomer segments through the polyhydroxyfunctional cross-linkers of the invention assure, however, at the same time a high load bearing capability of the foams.

The preferred polyetherpolyols may be employed in the foaming system as pure components or as mixtures of different polyetherpolyols. The mixtures may thus contain polyetherpolyols of different functionality, of different molecular weights and of different ethyleneoxide content. Thus, for example, a relatively high molecular diol may be foamed in mixture with a triol of a lower hydroxy equivalent weight.

The polyetherpolyols to be foamed may, moreover, contain in dissolved form low molecular compounds with two or more active hydrogen atoms and a molecular weight of up to 750. Examples for such compounds whose purpose is to stabilize, in cross-linking manner, the forming polymeric foam skeleton in its initial phase, are glycerin, trimethylolpropane and their addition products with alkyleneoxides, such as ethyleneoxide and propyleneoxide, further, triethanolamine and other addition products of propyleneoxide and/or ethyleneoxide to aliphatic or aromatic polyamines.

The preparation of the polyurethane foams may be effected pursuant to the prepolymer procedure or, preferably, pursuant to the one-shot procedure. According to the oneshot procedure, the foam preparation may be accomplished at room temperature or at elevated temperature by mixing the polyisocyanate with the indicated polyetherpolyols, water, and in some instances, organic propellants as well as stabilizers or emulsifiers and activator auxiliary agents and the crystalline polyhydroxy compounds of the invention being added to the system.

As stabilizers or emulsifiers, surface active compounds are suitable. These surface active compounds should preferably contain alkylsiloxane groups which may be modified with polyoxyalkylene units or segments. Compounds of this nature and which are suitable for the inventive purpose are disclosed, for example, in British Pat. Nos. 1,015,611, 994,396, and 983,850. Further, such disclosure is contained in German Offenlegungsschrift 2,221,811 and in "Block Copolymers" by D. C. Allport and W. H. Janes, London, 1973, p. 305.

Concerning the catalysts, tertiary amines, if desired in combination with organic metal compounds, may be used. While tertiary amines predominantly catalize the reaction between water and isocyanate groups under evolution of $CO_2$, organic metal compounds primarily accelerate the reaction between organic hydroxyl groups and isocyanates. Examples for amine activators are triethylenediamine, dimethylethanolamine, dimethylbenzylamine and N-ethylmorpholine. Suitable organic metal compounds which, if desired, may be used in combination with amine activators, are, for exampe, tin (II) -octoate or dibutyltindilaurate. The nature, quantity and combination of the activators to be used are chosen in such a manner that favorable reaction conditions from a foaming technical point of view are obtained. The criteria which should be observed in choosing and determining the catalyst components are well known to persons who are skilled in the production of polyurethane foams.

The preparation of the polyurethane foams may be effected in closed molds or as slab foam. When the foaming is carried out in molds, the reaction mixture to be foamed is inserted into a mold of metal or plastic. Generally, the amount of foamable reaction mixture to be inserted will be such that the mold is just filled. However, it is feasible to use larger amounts of foamable mixture. In producing slab foam, to wit, in open vessels, the mixture to be foamed is inserted into a stationary open paper mold or onto a conveyor belt which moves with uniform speed and which is coated with paper. The finish-foamed mold or slab foam bodies, may subsequently be subjected to an aftertreatment, such as, for example, heating with hot air or treatment with heat radiation or micro waves.

The increase of the hardness obtained pursuant to the inventive procedure is of particular interest for foam systems which are marketed under the names HR or cold foam which are characterized by extremely high resiliency but for many purposes are too soft.

In the polyurethane foams, cross-linked pursuant to the invention, the hardness for 25% and for 65% compression may uniformly increase percentagewise or the ultimate hardness may increase to a relatively greater extent than the initial hardness. In the latter case, the inventive procedure, as compared to an identical foam body of the same unit weight or density but without the inventive cross-linkers, causes not only a hardness increase but also an increase of the SAC factor (of the load proportion) which is defined as the quotient of the hardness at 65 and 25 percent compression. The above-mentioned improvements of the properties of the polyurethane foams are of particular utility in respect of foam systems which are formed from higher molecular, ethyleneoxide containing polyetherpolyols with polyisocyanates of functionalities of 2 and/or >2. Such foam systems could not be cross-linked to any desired extent pursuant to prior art methods, if important and decisive disadvantages, such as the closing of the cells, shrinkage as well as bad crushing behavior during attempts to open the cells were to be avoided. By contrast, the inventive procedure results in highly cross-linked, elastic and resilient foam systems whose foambility is not lost by early gelling.

The inventive foams have the same utility as other polyurethane foams and are particularly suitable for upholstery and cushioning purposes.

As noted hereinabove, one of the important aspects of the preparation of the urethane foams is immediate availability of the propellant in the reaction. This availability is generally assessed by the so-called "creaming time" of the reaction, which is the time that elapses until the formulation assumes a cream-like appearance due to the commencing $CO_2$ formation. It thus becomes clearly desirable to reduce the "creaming time" as much as possible.

Furthermore, in a preferred embodiment of the process described hereinabove, this is obtained by stirring a preferably concentrated, aqueous solution of the polyols into the polyether polyol, whereby the polyol is precipitated as a finely divided, crystalline material.

It appears then that such dispersions of polyols in the polyester polyols become increasingly viscous in the course of several days and may even solidify in part. It is therefore necessary to use these dispersions as soon as possible after their formation.

We have further discovered that if all, or a portion of compounds that break down the association of water molecules, is added to the dispersions, it is possible to stabilize the dispersions so that they can be stored with practically no time limit. Also, as noted hereinbefore, the use of such compounds frees the water and this further reduces the "creaming time".

An especially preferred embodiment of the inventive process comprises dissolving all or a portion of the compounds that break down the association of water molecules in the aqueous solutions, which are dispersed in the polyether polyols with precipitation of the polyol.

Compounds having the general formula

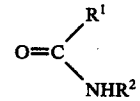

have shown themselves to be especially useful as compounds that break down the association of water molecules. In the above formula, $R^1$ is a $CH_3-$, $NH_2-$, $NHR^3-$ or $NR_2^3-$ group, $R^3$ an alkyl group with 1 to 4 carbon atoms and $R^2$ hydrogen or an alkyl group with 1 to 4 carbon atoms.

Further compounds, which can be used in the inventive process, are ethylene urea or ammonium salts with voluminous, i.e., relatively large size, anions, such as, bromide and iodide. Examples are tetramethylene ammonium bromide and tetraethyl ammonium iodide.

The more hydrophilic substances of the above-named compounds are preferred, i.e., those which are more soluble in water than in the organic components of the reaction mixture that is to be foamed. The use of urea is especially preferred.

The invention will now be described by several examples, it being understood that these examples are given by way of illustration and not by way of limitation and that many changes may be effected without affecting in any way the scope and spirit of the invention as recited in the appended claims.

EXAMPLE 1

A mixture of the following composition was prepared:
- 100.00 parts by weight of a glycerin-based polyoxyalkylenetriol composed of 84% by weight of propyleneoxide and of 16% by weight of ethyleneoxide, having an OH number of 35 and in which 1.5 parts by weight of sorbite were dispersed
- 3.00 parts by weight of water
- 0.35 parts by weight of triethylenediamine
- 2.00 parts by weight of triethanolamine
- 1.00 parts by weight of polyether modified siloxane (for example, known in the trade as "TEGOSTAB B 3706")
- 5.00 parts by weight of trichlorofluoromethane This mixture was brought to reaction in an open vessel with 51.6 parts by weight of a mixture of 67 parts by weight of toluylenediisocyanate (T 80) and 33 parts by weight of crude diphenylmethanediisocyanate. An open cell foam body which does not shrink and having the following mechanical characteristics is obtained:

Density: 30.8 g/l
Hardness at 25% Compression: 15.8 p/cm$^2$
Hardness at 65% Compression: 46.5 p/cm$^2$
SAC Factor: 2.93

By comparison: Foaming without inventive crystalline polyhydroxy compounds.

a. A mixture having the above composition, however, no sorbite, being dispersed in the polyoxyalkylenetriol is reacted with 47.5 parts by weight of the above-mentioned isocyanate mixture. An open cell foam body is obtained, having the following mechanical characteristics:

Density: 30.2 g/l
Hardness at 25% Compression: 10.2 p/cm$^2$
Hardness at 65% Compression: 30.0 p/cm$^2$
SAC Factor: 2.95 b. A mixture having the same composition as in a) is reacted with 51.5 parts by weight of the above-mentioned isocyananate mixture in an open vessel. The reaction mixture thus contains an excess of 12 mol-% of isocyanate groups, calculated on those groups which are present in the mixture and react with the isocyanate. A closed cell foam body is obtained which strongly shrinks upon storage.

c. 100.00 parts by weight of the above-mentioned polyetherpolyol
   4.50 parts by weight of a solution of 1.5 parts by weight of sorbite in 3.0 parts by weight of water
   0.35 parts by weight of triethylenediamine
   2.00 parts by weight of triethanolamine
   1.00 parts by weight of the above-mentioned polyether modified siloxane, and
   5.00 parts by weight of trichlorofluoromethane
are mixed and immediately brought to reaction in an open vessel with 51.5 parts by weight of the above-mentioned isocyanate mixture. A closed cell foam body is obtained which shrinks upon storage. If the closed cell structure of the foam body is mechanically broken up within 10 minutes after its production, the following mechanical characteristics could be observed:

Density: 31.0 g/l
Hardness at 25% Compression: 15.4 p/cm$^2$
Hardness at 65% Compression: 47.5 p/cm$^2$
SAC Factor: 3.1 d. A mixture having the same composition as in a), however, with the difference that a further amount of 2 parts by weight of triethanolamine is added, is reacted in an open vessel with 51.6 parts by weight of the above-mentioned isocyanate mixture. A closed cell foam body is obtained. If the foam body, prior to the shrinkage, is subjected to mechanical crushing, the following mechanical characteristics can be observed:

Density: 32.0 g/l
Hardness at 25% Compression: 15.6 p/cm$^2$
Hardness at 65% Compression: 46.6 p/cm$^2$
SAC Factor: 3.0

The comparison of the foam bodies produced in accordance with this Example clearly indicates that the increase in hardness can be obtained both with soluble cross-linking agents and also with a solution of the crystalline cross-linker. However, an open cell foam body with increased cross-linking is only obtained if, in accordance with the inventive procedure, the crystalline cross-linker is incorporated into the reaction mixture to be foamed in the form of a disperse, solid phase. Further, comparison Example b) indicates that the advantage obtained in accordance with the inventive procedure is not caused by an increase of the isocyanate content.

EXAMPLE 2

The following mixture was prepared:
- 60.0 parts by weight of a glycerin-based polyoxyalkylenetriol. The triol was composed of 84% by weight of propyleneoxide and of 16% by weight of ethyleneoxide and had an OH number of 35.
- 15.0 parts by weight of a dispersion of 1.5 parts by weight of sorbite in the above-mentioned polyether, the dispersion having been prepared pursuant to Example 5.
- 40.0 parts by weight of a glycerin-based polyoxyalkylenetriol composed of 92% by weight of propyleneoxide and 8% by weight of ethyleneoxide and having an OH number of 21.5.
- 3.0 parts by weight of water
- 2.0 parts by weight of triethanolamine
- 0.5 parts by weight of triethylenediamine
- 1.0 parts by weight of polyether modified polysiloxane (known in the trade under the designation "TEGOSTAB B 3706")
- 5.0 parts by weight of trichlorofluoromethane.

This mixture was brought to reaction with 50.2 parts by weight of a mixture of 67 parts by weight of toluylenediisocyanate (80% 2.4- and 20% 2.6-isomeric mixture) and 33 parts by weight of crude diphenylmethanediisocyanate. A foam body of the following mechanical characteristics was obtained:

Density: 30.0 g/l
Hardness at 25% Compression: 10.0 p/cm$^2$
Hardness at 65% Compression: 30.2 p/cm$^2$ SAC Factor: 3.0

Comparison Example

A mixture of the above composition, however, without sorbite and with only 0.35 parts by weight of triethylenediamine, was reacted with 46.1 parts by weight of the above isocyanate mixture in an open vessel. A foam body with the following mechanical characteristics was obtained:

Density: 31.4 g/l
Hardness at 25% Compression: 8 p/cm$^2$
Hardness at 65% Compression: 23 p/cm$^2$
SAC Factor: 2.9

A comparison of the mechanical characteristics of the two foam bodies clearly indicates that due to the additional cross-linking with sorbite, the hardness of the foam body is significantly increased. If instead of using the crystalline cross-linker, the same molar amount of hydroxy groups is applied in the form of a soluble trifunctional cross-linker, such as, for example, triethanolamine or glycerin, a closed cell foam body is obtained instead which, upon cooling, shows slight to strong shrinkage.

EXAMPLE 3

A mixture having the following composition was prepared:
- 82.00 parts by weight of a glycerin-based polyoxyalkylenetriol built up from 95% by weight of propyleneoxide and 5% of ethyleneoxide and having an OH number of 48.
- 20.00 parts by weight of a dispersion, prepared pursuant to Example 6, of 2.0 parts by weight of trimethylolmelamine in 18 parts by weight of the above-mentioned polyol.
- 4.05 parts by weight of water
- 3.00 parts by weight of trichlorofluoromethane
- 0.80 parts by weight of polyether modified polysiloxane (known in the trade, for example, under the designation "TEGOSTAB B 2370")
- 0.27 parts by weight of Sn(II)octoate
- 0.10 parts by weight of dimethylethanolamine
- 0.04 parts by weight of N-ethylmorpholine.

This mixture was intensively mixed and, in an open foam box, brought to reaction with 53.5 parts by weight of a mixture of 80% by weight of 2,4- and 20% by weight of 2,6-toluylenediisocyanate. A foam body with the following mechanical characteristics was obtained:

Density: 23.6 g/l
Hardness at 25% Compression: 40 p/cm$^2$
Hardness at 40% Compression: 43.5 p/cm$^2$
Hardness at 65% Compression: 77 p/cm$^2$
Porosity: 8.5
SAC Factor : 2.0

Comparison Example a) A foam produced from the above-mentioned mixture, however, without trimethylolmelamine, and 51.5 parts by weight of the above-mentioned toluylenediisocyanate, has the following mechanical characteristics:

Density: 23.5 g/l
Hardness at 25% Compression: 30 p/cm$^2$
Hardness at 40% Compression: 32.5 p/cm$^2$
Hardness at 65% Compression: 61 p/cm$^2$
Porosity: 7.6
SAC Factor: 2.05 b) A foam, produced from the above-mentioned mixture in which, however, instead of 2 parts by weight of trimethylolmelamine, 1.4 parts by weight of triethanolamine were used, and 51.5 parts by weight of the above-mentioned toluylenediisocyanate exhibited a very closed cell structure and, moreover, shrunk slightly upon cooling. The porosity was at 150 mm.

The porosity values listed in this Example are values for the dynamic pressure in mm water column which builds up if air is forced through a 5 cm high foam layer, the air flowing through a nozzle which bears directly on the foam body. Higher porosity values indicate thus a lower air permeability. A detailed description of this measuring method is contained, for example, in the publication "Goldschmidt informiert" March 1970, No. 12, p. 20.

In comparing the foam bodies of this Example, it will be noted that due to the inventive incorporation of the cross-linker in the system, the foam hardness, while maintaining the same density, is significantly increased. The open cell nature of the foam bodies decreases to a very slight extent only. By contrast, if equimolar amounts, calculated on reactive hydroxy groups, of a soluble cross-linker are introduced into the system, the open cell nature of the foam bodies strongly decreases.

EXAMPLE 4

A mixture was prepared having the following composition:
- 87.25 parts by weight of a glycerin-based polyoxyalkylenetriol which was built up from 83% by weight of propyleneoxide and 17% by weight of ethyleneoxide and having an OH number of 28.
- 15.00 parts by weight of a dispersion produced according to Example 7 and containing 10% by weight of sorbite and 4.5% by weight of water in the same polyol as dispersion agent.
- 2.33 parts by weight of water
- 2.00 parts by weight of triethanolamine
- 0.33 parts by weight of triethylenediamine
- 1.00 parts by weight of polyether modified polysiloxane (trade name "TEGOSTAB B 3705")
- 5.00 parts by weight of trichlorofluoromethane.

This mixture was intensely agitated and reacted in an open foam box with 52.5 parts by weight of a solution of trimerized toluylenediisocyanate in toluylenediisocyanate having an NCO number of 39. An open cell, non-shrinking foam body with the following mechanical characteristics was obtained:

Density: 32 g/l
Hardness at 25% Compression: 17 p/cm$^2$
Hardness at 65% Compression: 58 p/cm$^2$
SAC Factor: 3.4

Comparison Example a. A mixture of the above composition, however, without the addition of sorbite, is brought to reaction with 48 parts by weight of the above-mentioned polyisocyanate in an open vessel. A foam body is obtained having the following mechanical characteristics:

Density: 32.5 g/l

Hardness at 25% Compression: 9.0 p/cm²
Hardness at 65% Compression: 28.5 p/cm²
SAC Factor: 3.1 b. A mixture of the above composition, however, with the difference that instead of sorbite, 1.5 parts by weight of glycerin were added, is reacted with 52.5 parts by weight of the above-mentioned polyisocyanate in the manner indicated above. A partially closed foam body is obtained which shrinks upon cooling at the side surfaces. If a foam body produced in analogous manner is subjected to mechanical crushing prior to the shrinking, the following mechanical characteristics are observed:

Density: 32.0 g/l
Hardness at 25% Compression: 15.0 p/cm²
Hardness at 65% Compression: 49.5 p/cm²
SAC Factor: 3.1

A comparison of the foam bodies of this Example clearly indicates that the hardness is strongly increased by the inventive cross-linker. The open cell nature of the foam is preserved. The addition of a substantially the same molar amount of hydroxy groups of a soluble cross-linker results in a lower hardness increase and, moreover, causes the formation of a closed foam body.

The following Examples describe the preparation of dispersions of the crystalline polyhydroxy compounds in polyetherpolyols:

EXAMPLE 5

A mixture consisting of the following is prepared:
89 parts by weight of a glycerin-based polyoxyalkylenetriol which was built up from 84% by weight of propyleneoxide and 10% by weight of ethyleneoxide and having an OH number of 35.
10 parts by weight of sorbite, and
1 part by weight of 1,3,5,7-tetramethyl-tetralauroyl-propylcyclotetrasiloxane.
This mixture was heated to 120° C under stirring which exerted strong shearing forces.

Upon rapid cooling of the formed emulsion, a relatively stable dispersion of the sorbite in the polyetherpolyol is formed. The melting point of the dispersed phase was at 91° C.

EXAMPLE 6

A mixture consisting of the following was prepared:
89 parts by weight of a glycerin-based polyoxyalkylenetriol and composed of 95% by weight of propyleneoxide and 5% by weight of ethyleneoxide and having an OH number of 48.
10 parts by weight of trimethylolmelamine, and
1 part by weight of the emulsifier mentioned in Example 5.
This mixture was inserted into a ball mill and was ground for 24 hours at room temperature. A dispersion of the melamine derivative in polyetherpolyol was obtained which remained stable for several weeks. The melting point of the dispersed phase was at 137° C.

EXAMPLE 7

A solution of 10 parts by weight of sorbite in 4.5 parts by weight of water and 0.5 parts by weight of the emulsifier of Example 5 was added under stirring with shearing forces to 85 parts by weight of the polyetherpolyol mentioned in Example 4. The sorbite precipitated in finely dispersed manner. A very stable dispersion was obtained which, after 24 hours after preparation according to DT-analysis, had an inflection point at 50° to 60° C which increased in the course of 5 days to 87° C.

EXAMPLE 8

A mixture of the following components was prepared:
75 parts by weight of the polyoxyalkylenetriol mentioned in Example 5, and
25 parts by weight of sorbite.
This mixture was introduced into a ball mill filled with steel balls and was ground for 24 hours at room temperature. A stable dispersion was obtained which at 25° C had a viscosity of 8,000 cP. The melting point of the dispersed phase was at 94° C.

EXAMPLE 9

The sixfold amount of a mixture consiting of
94.0 parts by weight of the polyoxyalkylenetriol of Example 1
8.0 parts by weight of the dispersion produced pursuant to Example 8
3.0 parts by weight of water
2.0 parts by weight of triethanolamine
0.2 parts by weight of triethylenediamine
0.4 parts by weight of dimethylethanolamine
1.0 part by weight of methylphenylsiloxane of the general formula

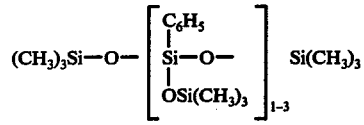

(known in the trade under the designation "DD 3043") was intensely mixed with 54.4 parts by weight of the polyisocyanate of Example 4. The mixture was introduced into a metal mold which latter had been preheated to a temperature of 45° C. The metal mold was closed and the reaction was initiated. The metal mold had a volume of 20 l. An open cell foam body with the following mechanical characteristics were obtained:

Density: 46 g/l
Hardness at 25% Compression: 41 p/cm²
Hardness at 65% Compression: 110 p/cm²
SAC Factor: 2.7
Pressure drop (75%): 9.7%
Elongation: 90%
Tensile strength: 1.7 kp/cm²
Bounce characteristic: 61%

Comparison Example a. A mixture of the above composition, however, without the inventive cross-linker, was reacted in a metal mold with 48.3 parts by weight of the polyisocyanate of Example 4 in the same manner as described above. An open cell foam body with the following mechanical characteristics is obtained:

Density: 40.6 g/l
Hardness at 25% Compression: 25 p/cm²
Hardness at 65% Compression: 67 p/cm²
SAC Factor: 2.7
Pressure drop (75%): 7%
Elongation: 110%

Tensile strength: 1.5 kp/cm²
Bounce characteristic: 67% b. A mixture of the above composition, however, without the addition of the inventive cross-linker, but additionally containing 2 parts by weight of glycerin, is reacted in the above-described manner with 54.5 parts by weight of the above-mentioned polyisocyanate. The reaction, as in the previous Example, was carried out in a metal form preheated at 45° C. A closed cell foam body is obtained which, upon opening of the mold, bursts open due to its high inner pressure.

EXAMPLE 10

The sevenfold amount of a mixture consisting of
95.2 parts by weight of the polyol of Example 1
8.0 parts by weight of a dispersion, produced analogously to that of Example 8 but containing 16.7% by weight of sucrose, 7.8% by weight of sorbite and 15% by weight of water in 60.5% by weight of a polyoxyalkylenetriol which is composed of 91% by weight of propyleneoxide and 9% by weight of ethyleneoxide and having an OH number of 46
1.6 parts by weight of water
2.0 parts by weight of triethanolamine
0.25 parts by weight of triethylenediamine
0.3 parts by weight of dimethylethanolamine
0.4 parts by weight of methylphenylsiloxane of the formula pursuant to Example 9 (known in the trade as "DD 3043"), and
10.0 parts by weight of trichlorofluoromethane is reacted with 50.2 parts by weight of a mixture of 60% by weight of toluylenediisocyanate (80% of 2,4- and 20% of 2,6-isomeric mixture) and 40% by weight of crude diphenylmethanediisocyanate. The reaction is effected in a mold which was preheated to 40° C and was coated with epoxy resin. The mold had a volume of 24 l. An open cell foam body with a unit weight of 41.2 g/l was obtained. The hardness of the foam body at 40% compression is 42% higher than that of a foam body of the same unit weight and which was produced according to the above formulation, however, without the addition of the inventive cross-linker, and thus, correspondingly, was produced with but 44.5 parts by weight of the above isocyanate mixture. If, instead of the inventive cross-linker, 2.6 parts by weight of triethanolamine are incorporated into the above formulation, a closed cell foam body is obtained which tears open interiorly when the mold is opened.

The following examples illustrate the use of a compound which breaks down the association of water molecules in accordance with a preferred embodiment of the present invention as described hereinabove:

A mixture consisting of
100.00 parts by weight of a polyoxyalkylene triol, started with glycerine and composed of 84% by weight of propylene oxide and 16% by weight of ethylene oxide and having an OH number of 35,
1.96 parts by weight water
2.00 parts by weight glycerine
1.00 parts by weight triethylenediamine
0.40 parts by weight dimethyl ethanolamine
6.0 parts by weight of a dispersion of 25% by weight of sorbitol and 7% by weight of urea in a polyoxyalkylene triol, started with glycerine and composed of 84% by weight of propylene oxide and 16% by weight of ethylene oxide and having an OH number of 35, whereby the dispersion contains 14% by weight of water
1.00 parts by weight of a polyether-polysiloxane block copolymer
10.00 parts by weight trichlorofluoromethane, is made to react, in an open box, with 51.5 parts by weight of a mixture of 65 parts by weight of toluylene diisocyanate (T 80) and 35 parts by weight of crude diphenylmethane diisocyanate. An open-celled, non-shrinking foam body with a height of 28.5 cm results. The creaming time of the foam formulation is 10 sec., the rising time 105 sec.

A reaction mixture, having the above-mentioned composition, however, with the exception that the sorbitol dispersion contains no urea, also forms an open-celled, nonshrinking foamed body. However, it reaches a height of only 27 cm and the creaming time of the formulation is 15 sec. and the rising time 135 sec.

The technical improvement achieved with this aspect of the present invention is shown still further since the dispersion of sorbitol in polyether polyol, which contained urea remained uniformly liquid, even after several weeks, during the entire observation time, while the preparation which contained no urea became increasingly viscous within three days. The crystalline portion of the dispersion finally became so coarse that the polyether polyol preparation solidified after one week.

What is claimed is:
1. A process for producing cross-linked, resilient, urethane-group comprising foams of open-cell structure which comprises foaming a system of
   (a) di or trifunctional active hydrogen atom comprising a polyetherpolyol of hydroxy equivalent weights of between about 700 –5,000;
   (b) a di or trifunctional polyisocyanate;
   (c) catalyst;
   (d) blowing agent; and
   (e) a cross-linker, said cross-linker being a crystalline saturated or unsaturated, aliphatic, cycloaliphatic, heteroaliphatic or arylaliphatic polyhydroxy compound having at least three hydroxy groups which, at room temperature, is insoluble or only slightly soluble in the system to be foamed and which melts in a temperature range of about 60° to 160° C, said cross-linker being used in quantities of 0.1 to 5.0 hydroxy equivalent weights calculated on one hydroxy equivalent weight of the polyol in the system, and wherein about 0.5 to 50% by weight, based on the amount of water in the foaming system, of compounds which break down the association of water molecules, are added to the foaming system prior to foaming.

2. The process of claim 1 wherein said polyhydroxy compound has primary and/or secondary hydroxy groups.

3. The process of claim 1 wherein the polyhydroxy compound contains 3 to 8 primary or secondary hydroxy groups.

4. The process of claim 1 wherein said polyhydroxy compound melts in a range of 80° to 130° C.

5. The process of claim 1 wherein said cross-linker is present in the system in amounts of 0.2 to 3.0 hydroxy equivalent weights, calculated on one hydroxy equivalent weight of the polyol to be foamed.

6. The process of claim 1 wherein said cross-linker is dispsersed in the polyol used in the foaming system.

7. The process of claim 1 wherein said cross-linker is sorbite, trimethylolmelamine, hexamethylolmelamine, glucose, or erythrite.

8. The process of claim 1 wherein said system comprises additionally emulsifier or stabilizer.

9. The process of claim 1 wherein the cross-linker is first dispersed in a polyol which is identical with or different from the polyol to be foamed, whereafter the dispersion is added to the foaming system.

10. The process of claim 1 wherein first a dispersion of the cross-linker in a suitable dispersion agent compatible with the foaming system is formed, whereafter the dispersion is added to the foaming system.

11. The process of claim 1 wherein all or a portion of the compounds which break down the association of water molecules, is dissolved in the polyol solutions which are dispersed, with precipitation of the polyol, in the polyether polyol.

12. The process of claim 1 wherein the compound which breaks down the association of water molecules has the general formula

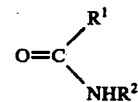

wherein $R^1$ is a $CH_3-$, $NH_2-$, $NHR^3-$ or $NR_2^3-$ group, $R^3$ is an alkyl group with 1 to 4 carbon atoms and $R^2$ is hydrogen or an alkyl group with 1 to 4 carbon atoms.

13. The process of claim 12 wherein the compound is urea.

* * * * *